(12) United States Patent
Wiltzer et al.

(10) Patent No.: US 7,615,606 B2
(45) Date of Patent: Nov. 10, 2009

(54) METHOD AND DEVICE FOR CONTINUOUSLY PRODUCING COPOLYAMIDES WITH MELTING POINTS GREATER THAN 265° C.

(75) Inventors: Karlheinz Wiltzer, Bad Blankenburg (DE); Gunda Morgenstern, Saalfeld (DE); Peter Lausmann, Rudolstadt (DE)

(73) Assignee: PE Polymer Engineering GmbH & Co. Forschungs KG (DE)

( * ) Notice: Subject to any disclaimer, the term of this patent is extended or adjusted under 35 U.S.C. 154(b) by 141 days.

(21) Appl. No.: 11/630,217

(22) PCT Filed: May 21, 2005

(86) PCT No.: PCT/EP2005/005528

§ 371 (c)(1),
(2), (4) Date: Dec. 20, 2006

(87) PCT Pub. No.: WO2005/123807

PCT Pub. Date: Dec. 29, 2005

(65) Prior Publication Data

US 2008/0051527 A1 Feb. 28, 2008

(30) Foreign Application Priority Data

Jun. 21, 2004 (DE) ............... 10 2004 029 935

(51) Int. Cl.
*C08G 69/08* (2006.01)
(52) U.S. Cl. .................. 528/310; 526/65; 526/60
(58) Field of Classification Search .......... 528/272, 528/310
See application file for complete search history.

(56) References Cited

U.S. PATENT DOCUMENTS 2,985,626 A * 5/1961 Caldwell et al. ......... 528/329.1
3,280,140 A * 10/1966 Sharkey ................. 548/312.7

(Continued)

FOREIGN PATENT DOCUMENTS

DE  42 34 710 A1  4/1994

(Continued)

OTHER PUBLICATIONS

Goodman et al. (Encyclopedia of Polymer Science and Engineering, p. 43, vol. 12, Wiley-Interscience, 1988).*

(Continued)

*Primary Examiner*—Randy Gulakowski
*Assistant Examiner*—Shane Fang
(74) *Attorney, Agent, or Firm*—Ostrolenk Faber LLP

(57) ABSTRACT

The invention relates to a method for continuously producing copolyamides with melting points greater than approximately 265° C. According to the invention, in a continuous process, partially aromatic and partially crystalline polyamides of the following chemical systems with defined molar percentages of the individual components are produced during the synthesis of polymers: 30 to 50 mol % of aromatic dicarboxylic acids, which are derived from terephthalic acid; 30 to 50 mol % of aliphatic diamines, which are derived from hexamethylenediamine or of cycloaliphatic diamines having at least 6 C atoms, and; 0.5-25 mol % of aromatic diamines or cyclic diamines with at least 6 C atoms. The sum of all polymer-forming components add up to a composition of 100 mol %, and a stoichiometric ratio between amines and carboxylic acids exists.

19 Claims, 1 Drawing Sheet

U.S. PATENT DOCUMENTS

Figure 1:
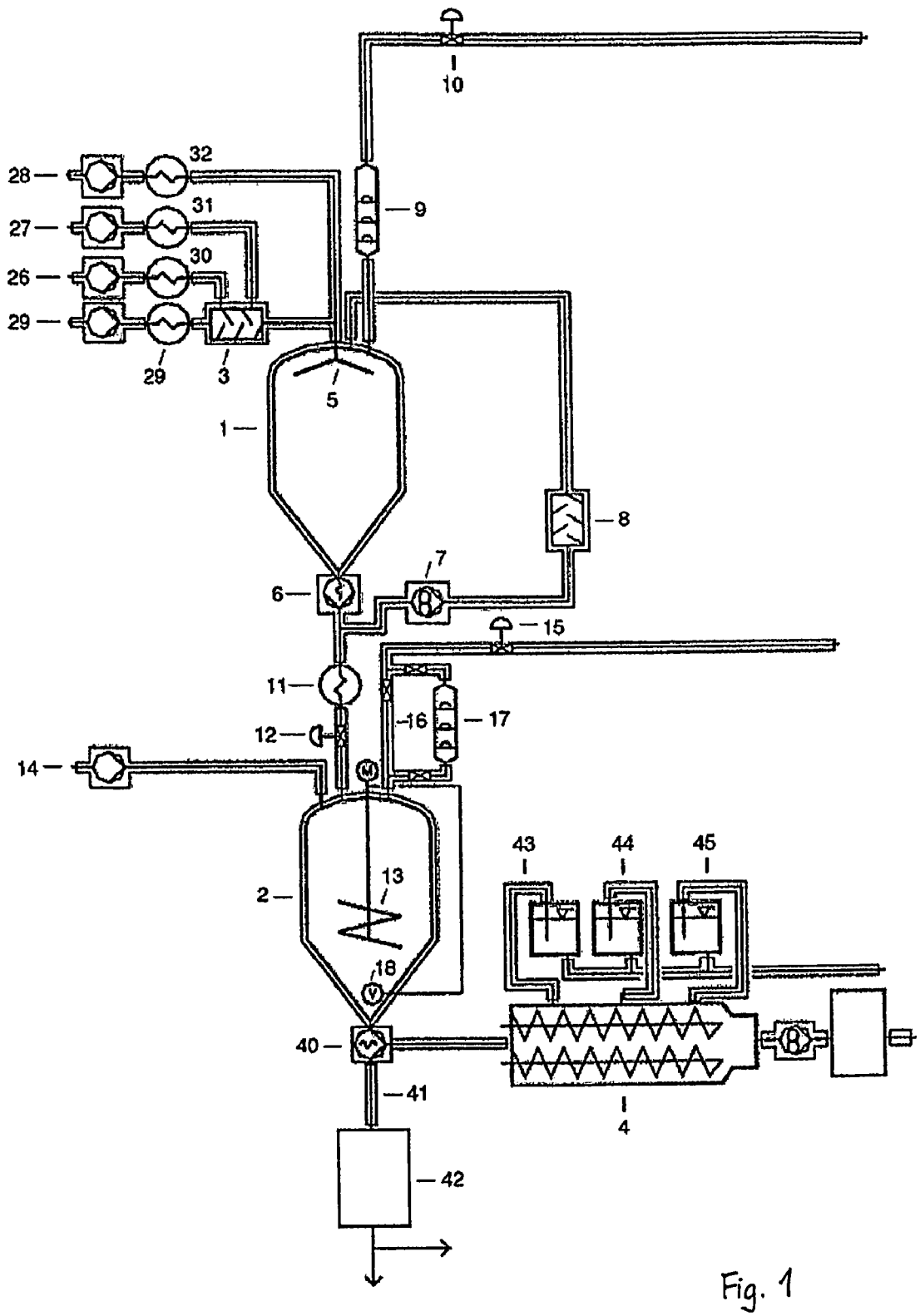

| | | | | |
|---|---|---|---|---|
| 3,443,909 | A | * | 5/1969 | Gunter .................. 422/108 |
| 3,937,752 | A | * | 2/1976 | Ueno et al. ............. 525/432 |
| 4,049,638 | A | * | 9/1977 | Doerfel et al. .......... 528/323 |
| 4,060,517 | A | * | 11/1977 | Mertes et al. .......... 528/335 |
| 4,831,108 | A | | 5/1989 | Richardson et al. |
| 4,963,646 | A | | 10/1990 | Galland et al. |
| 5,098,940 | A | | 3/1992 | Brooks |
| 5,688,901 | A | * | 11/1997 | Fisch et al. ............ 528/310 |
| 6,429,279 | B1 | * | 8/2002 | Hunger et al. .......... 528/310 |

FOREIGN PATENT DOCUMENTS

| | | |
|---|---|---|
| DE | 44 04 250 A1 | 8/1995 |
| DE | 195 04 058 A1 | 8/1996 |
| EP | 0 121 984 B1 | 10/1984 |
| EP | 0 129 195 B1 | 12/1984 |
| EP | 0 291 096 A2 | 11/1988 |
| EP | 0 299 444 B1 | 1/1989 |
| EP | 0 310 752 B1 | 4/1989 |
| EP | 0 327 979 B1 | 8/1989 |
| EP | 0 410 649 A1 | 1/1991 |
| EP | 0 693 515 B1 | 1/1996 |

OTHER PUBLICATIONS

International Search Report dated Sep. 7, 2005 in for International Application No. PCT/EP2005/005528.

* cited by examiner

METHOD AND DEVICE FOR CONTINUOUSLY PRODUCING COPOLYAMIDES WITH MELTING POINTS GREATER THAN 265° C.

CROSS REFERENCE TO RELATED APPLICATION

The present application is a 35 U.S.C. § 371 national phase conversion of PCT/EP2005/005528, filed May 21,2005, which claims priority of German Patent Application No. 10 2004 029 935.8 filed Jun. 21, 2004, which is herein incorporated by reference. The PCT International Application was published in the German language.

The invention relates to a method for continuously producing copolyamides having melting points of more than about 265° C. of the type mentioned in the preamble of claim 1.

It is known that the introduction of aromatic molecules into polyamides (e.g. PA 6T) increases the melting points and the thermal stability compared with the aliphatic polyamides (e.g. PA 6, PA 66).

Such polyamides with melting points greater than 265° C. and with increased thermal stability are very interesting for many industrial fields of use.

The methods for the production of partly aromatic polyamides are characterized in particular by the structure-related high melt viscosities which are based on the chain-stiffening effect of the aromatic moiety.

Depending on the aromatic and also crystalline fractions in the melt, the melt viscosities and the melting points can increase to an extreme extent.

The production and processing windows in turn are greatly limited by the temperature since melting points and decomposition temperatures of partly aromatic polyamides are often close together.

Owing to the high technological requirements for carrying out the polycondensation process and the reactor design for the production of partly aromatic polyamides, novel solutions have to be found with regard to the copolyamides themselves and for their methods—in particular for very high-melting partly aromatic polyamides.

Batch technologies for the production of such partly aromatic products have the advantage that the product composition can be controlled and mastered in a defined manner. However, the disadvantage that only low average molar masses can be established in the polymer for complete discharge of the melt from the reactor predominates. Furthermore, owing to the discontinuity of the batch processes, qualitative variations in the polycondensate—in particular in the desired average degree of polymerization and in the molar mass distribution—cannot be avoided.

EP-A 410 649 and U.S. Pat. No. 4,963,646 disclose two-stage polycondensation processes which aim at a low viscosity in the melt. Postcondensations in the melt are subsequently effected in single-screw or twin-screw extruders. In principle, it is assumed here that a low-viscosity prepolymer is produced in a batch stage and is converted into the end condensate in an extruder.

The process according to EP-A 410 649 is a batch process for the production of dicarboxyl-terminated, low-viscosity polyamides to which equimolar amounts of diamine are added in an extruder. The condensation reaction taking place in the extruder and the removal of the condensate are controlled via a compression and subsequent decompression stage in the extruder. The high molecular weight product is discharged under pressure from the extruder.

A similar process sequence is described in the patent U.S. Pat. No. 4,963,646. However, dicarboxyl-terminated and diamine-terminated prepolymers are produced separately here and are caused to undergo further polycondensation in a vented extruder.

In these known batch processes the problems of transporting the high-viscosity melt are circumvented by the production of prepolymers in batch systems. Exact compliance with the stoichiometry when feeding the components into the extruder is associated with problems and leads to undesired quality differences of the product.

EP-B 0 693 515 describes how precondensates of partly aromatic semicrystalline or amorphous polyamides can be produced in batch processes taking place in a plurality of stages in succession. This process is intended to compensate the disadvantages of individually performed batch processes with metering of components into the extruder with regard to the stoichiometric adjustments between the components. The multistage batch processes are carried in two or three reactors over the following stages: salt formation phase from diamines and dicarboxylic acids in aqueous solutions at relatively low temperatures and high pressures, transfer phase for discharging the concentrated salt solution into a further reactor, reaction phase for conversion into precondensates at elevated temperatures and defined steam partial pressures, steady-state phase for adjusting temperature and steam pressure to the final reaction and the discharge phase in which the melt is sprayed into a cyclone. The lump-like and still low-viscosity prepolymers produced should be further condensed thereafter, the condensation procedure not being described.

Partly aromatic semicrystalline and amorphous copolyamides which are preferably produced from systems comprising caprolactam, hexamethylenediamine and terephthalic acid or adipic acid, hexamethylenediamine and terephthalic acid are described in the patents EP-A 327 979 and EP-A 299 444. However, these polyamides are still poorly rated with regard to their achieved toughness.

As described in EP-A 310 752, EP-A 121 984, EP-A 291 096, DE 42 84 710 A1 or DE 195 04 058 A1, attempts were made by additions—primarily by addition of isophthalic acid and combinations with fillers and additives—further to improve the mechanical properties by a changed internal structure of the polymers. In addition to the very good thermal properties (high melting point of greater than 265° C.) of the partly aromatic polyamides, it is intended here to achieve a higher glass transition point (greater than 80° C.), higher heat distortion resistance, especially under load, higher crystallinity and lower water absorption.

Additions of isophthalic acid result in the molecular structure of the polymers being sterically changed so that angular molecular structures form. As a result, the glass transition temperature $T_g$ (temperature at which there is mobility of the molecules in the melt) of the polymers increases. However, there is the danger that the crystallinity will greatly decrease or crystalline structures will no longer be produced.

With an increase in the glass transition temperature, the melting points of the crystalline, partly aromatic polymers also increase. At a $T_g$ point of 140° C., the melting points of the partly aromatic polyamides are close to or greater than 345° C. In melt production processes, the product regime temperatures set therefore lead to thermal damage or decomposition of the polyamide.

DE 42 34 710 describes, for the possible formulations for the partly aromatic polyamides having preferably isophthalic acid moieties, a process by means of which the triamine contents can be kept below 0.5% by weight, preferably below 0.3% by weight.

Triamines form from the amine component used, hexamethylenediamine, as a function of temperature and residence time. These triamines lead to problems during the production process and to a deterioration in the product quality. Known process engineering aspects comprising rapid adjustment of the reaction temperature and the shortest possible residence times under temperature are therefore relied upon.

For this purpose, the starting monomers are prepared as 30% strength to 70% strength aqueous solutions and brought to temperatures of 280-330° C. under a pressure of from 1 to 10 bar within 60 seconds. The prepolymers thus formed are brought into a reaction zone having temperatures above the melting point (280-330° C.) and subjected to polycondensation in residence times of from 5 to 30 min by continuous withdrawal of steam. The diamines withdrawn with the steam removed are recycled.

The short, defined residence times are to be realized both for the heating-up of the raw material mixtures and for the entire reaction and the vaporization of water. This process therefore requires very complex and expensive control of the reaction stages following one another extremely rapidly. There is no technical solution to these problems; it will be possible with certainty only under laboratory conditions.

It is the object of the invention to provide a method of the type mentioned at the outset which permits the continuous production of polyamides having aromatic moieties, high crystallinity and melting points greater than 265° C.

This object is achieved by the features stated in patent claim 1.

Advantageous developments and further developments of the invention are evident from the subclaims.

According to the invention, the chemical composition of the partly aromatic polyamides is chosen so that partly aromatic polyamides having melting points of at least 265° C. and glass transition temperatures of at least 90° C. are produced, the polycondensation being carried out continuously by the multistage process technology and the polycondensation process being controlled in the individual stages of the method according to system-specific parameters. Here, reaction temperatures greater than 340° C. in the melt are avoided, and the devices are arranged as a cascade, resulting in multistage process technology.

According to a preferred embodiment, the partly aromatic, semicrystalline polyamides are used in the following molar percentages for the polymer synthesis, the sum of all polymer-forming components producing a composition of 100 mol % and it being necessary for there to be a stoichiometric ratio between amines and carboxylic acids:

from 25 to 50 mol % of aromatic dicarboxylic acids which are derived from terephthalic acid, from 30 to 49.5 mol % of aliphatic diamines which are derived from hexamethylenediamine, or cycloaliphatic diamines having at least 6 carbon atoms, and 0.5-25 mol % of aromatic diamines or cyclic diamines having at least 6 carbon atoms.

According to a further development of the invention, the composition furthermore comprises:

from 0 to 25 mol % of aliphatic dicarboxylic acids having at least 6 carbon atoms and/or 0-20 mol % of an aromatic aminocaproic acid having at least 7 carbon atoms and/or from 0 to 38 mol % of a monomer from the chemical group consisting of the lactams or an aliphatic aminocaproic acid having at least 6 carbon atoms.

The composition may furthermore contain polycondensation-influencing additives (data in % by weight since addition in equimolar amounts of starting components): 0-1.5% by weight of stabilizers from the group consisting of the mono-/dicarboxylic acids and/or mono-/diamines, based on 100% by weight of polymer-forming starting components, and 0-1.5% by weight of crystallization-controlling additives, based on 100% by mass of polymer-forming starting components.

The composition furthermore preferably contains water as solvent or suspending medium at the start of the reaction (data in % by weight since addition in equimolar amounts of starting components) in an amount of 2-30% by weight, based on 100% by weight of polymer-forming starting components.

According to a preferred development of the method, a continuous process technology comprising a first and second continuous pressure stage and optionally a postcondensation is used.

In the first continuous pressure stage, homogenization of the starting components, defined withdrawal of water in gaseous form from the reaction mixture and formation of prepolymers in water-containing melts are effected. All polymer-forming components are metered into a first reactor as aqueous salt solutions and/or as melt, including additives according to the mixture formulation, via preheating systems on surface-enlarging internals, and the homogenization of the starting components is effected via positive mixing devices before entry into the reactor and during the residence time in the first reactor. The melt is preferably transported via surface-enlarging internals in the total reactor.

The reaction temperatures of the individual components are adjusted as a function of the chemical system in the range from 180° C. to 260° C. before entry into the first reactor, and the vapor pressure for establishing polycondensate melts having a defined water content is predetermined. This vapor pressure is generated predominantly by the steam in the gas space of the first reactor, since the other gaseous components involved can be neglected with regard to their proportionate partial pressure in the gas space; their proportion is stable at a low level.

The polycondensation process is controlled via the water withdrawal in gaseous form under defined vapor pressure specifications in the range of 6-50 bar in the reactor, and the specification of the residence time as a function of the establishment of the chemical equilibrium under the predetermined vapor pressure.

The melt is discharged continuously at the end of the start phase via melt pumps into a second reactor in which water is removed from the melt in gaseous form and control of system-dependent polycondensate equilibria in the melt is effected as a function of the aromatic moiety of the chemical starting system according to predetermined melt viscosity/shear rate profiles.

Here, metering of further components into the reactor is possible, for example of amines, stabilizers, crystallization additives, additives and the like possible.

The reaction temperatures for the polycondensation are adjusted in the range from 250° C. to 340° C. depending on the system, required values for establishing approximately constant pressures possible in terms of control technology in the reactor gas space in the range of 0-30 bar being specified for degassing the water-containing melt and condensing the steam.

In the second pressure stage, control of the polycondensation process and of the polycondensate equilibrium is effected according to the system-dependent development of the dynamic melt viscosity, preferably and as a function of the aromatic moiety of the chemical starting system with introduction of a shear stress and establishment of different shear rates by means of suitable devices with simultaneous discharge of water via the condensation devices.

Control facilities are provided here by the melt flow behavior, which is measured via the dynamic melt viscosity of the highly condensed, viscoelastic polymer melt on on introduction of shear stress into the melt and hence of changed shear rates, and the withdrawal of water in gaseous form from the melt by means of the specification of a defined vapor pressure in the reactor.

By introducing a shear or shearing stress into the melt, it is possible to process in the second reactor melts which have a high aromatic fraction and, owing to their high viscosity and hence poor flowability, would otherwise be unprocessible or processible only with considerable difficulties.

Here too, the vapor pressure is generated predominantly by the steam in the gas space of the reactor, since the other gaseous components involved can be neglected with regard to their proportionate partial pressure in the gas space.

The highly condensed melt is discharged continuously from the second reactor for granulation, drying/solid postcondensation or the melt is discharged continuously via melt pumps into a third reactor for further postcondensation in the melt.

Preferably, withdrawal of water in gaseous form from the melt and control of the degree of polycondensation on the basis of the increase in the melt viscosity on emergence from the reactor are effected in the postcondenser or third reactor.

In the third reactor, the product temperatures are regulated in the range from 280° C. to 340° C., positive conveying of the melt by kneader systems being used.

The postcondensation is preferably achieved by thorough drying of the melt in vacuo or with water-conditioned nitrogen, the relative humidity of the nitrogen being $\Phi$<1.

Further control of the polycondensation can be achieved by means of melt drying and the resultant, system-dependent dynamic melt viscosity at low velocity gradient D<0.1 l/s on discharge from the postcondenser.

The highly condensed melt can be taken off from the postcondenser and granulated or directly further processed.

A working example of a device for carrying out the method according to the invention is described below with reference to the drawing.

The embodiment of the device which is shown in the drawing comprises a first reactor 1, a second reactor 2 and an optionally provided third reactor 3.

The polymer-forming components of the total system comprising diamines and dicarboxylic acids are first converted in the aqueous phase into the salt before using in the polycondensation. The salt formation ensures the establishment of the necessary equimolar ratios between the reactants at the beginning of the reaction. For this purpose, the starting components are brought into a liquid and/or suspended form which can be metered for a continuous method.

For this purpose, the solid starting materials in the appropriate ratio or the preformed salts are introduced into a dissolution container/suspending container. The excess amounts of water depend on the respective aromatic, aliphatic or cyclic components and may be up to 100% by weight, based on 100% by weight of the starting components in the dissolution stage. The water used in excess for dissolving or suspending the starting components should be removed from the system before the beginning of the polymer-forming reactions—to water contents of from 2 to not more than 30% by mass, depending on the system.

For stability reasons, concentration of the salt solution/salt suspension should be carried out only to such an extent that no oligoamide formation begins.

The water content of the concentrated solution/suspension is established via the specified required vapor pressure value. For retaining small amounts of monomeric components present in the ascending vapor, the ascending vapor is rectified. The monomeric starting materials separated off thereby are recycled to the product space.

Concentration should preferably be carried out under isothermal conditions. The amount of water to be expelled and hence the required concentration level for the concentration are specified by limitation of the required value of the system vapor pressure.

Monomeric starting materials having two functional groups, such as aminocaproic acids or lactams, are not converted into solutions/suspensions but are used in molten form in the mixing system 3 of the first pressure reaction stage in the first reactor 1.

The concentrated salt solutions/salt suspensions and all further polymer-forming molten components are fed continuously to the mixing system 3 via separate metering lines 21-23 and metering pumps 25-27 according to the formulation and the separate or common salt solutions prepared in each case. The starting materials pass through the preheating systems 29-31 and are brought to reaction temperature. The mixture adjusted to reaction temperature is passed directly and continuously onto the special surface-enlarging internals 5 in the first reactor 1.

Additives and/or reaction auxiliaries can be passed via a separate metering pump 28 and a preheating system 32 directly onto the surface-enlarging internals 5 of the reactor 1. However, feeding via the mixing system 3 can also be effected.

For homogenization of the melt, in particular of melts having high aromatic fractions or low water contents, there is the possibility at the discharge of the first reactor 1 of removing part-streams of the low molecular weight melt via a discharge pump 6 and optionally a further melt pump 7, a circulation line and a positive mixing chamber 8 and feeding said part-streams back to the first reactor 1 via the surface-enlarging internals 5 thereof.

In the first reactor 1, a continuous polycondensation of the reaction mixture to give low molecular weight polycondensates is effected under adiabatic process conditions at a pressure in the gas space which is kept constant.

The melt is transported in the entire first reactor 1 via the surface-enlarging internals 5 in order to realize a high degassing rate.

The regulation of the first pressure stage in the first reactor 1 is carried out on the basis of the vapor pressures specified for the respective chemical system in the range of 6-50 bar to a product-specific pressure with simultaneous degassing of the melt via a dephlegmator/reflux column 9 and a pressure control 10.

The vapor pressure to be specifically established in the first reactor 1 is dependent on the desired or required degree of polymerization and water content of the melt which is fed to the second condensation stage in the form of the second reactor 2. The vapor pressure of the other components is low—considered relative to the vapor pressure of the water—and can therefore be neglected for controlling the water content.

The steam removed is expediently separated via a rectification apparatus, preferably via a dephlegmator 9, from the small amount of monomeric fractions present in the ascending vapor. These monomeric fractions flow back into the first reactor 1. After the dephlegmator 9, the steam leaves the process via the control valve 10 to a liquid seal.

The reaction temperatures in the first reactor 1 are dependent on the chosen chemical system and the residence times required in this first pressure stage for establishing a chemical equilibrium. The residence times are in the range from 0.5 to not more than 2.5 hours.

In principle, the melting points in the first reactor 1 are in the range from 180° C. to 260° C. The melting points are not regulated directly. This is an adiabatic system in which the reaction temperatures are adjusted by preheating the starting materials in the preheating apparatuses 29 to 32.

The continuous discharge of the low molecular weight, water-containing melt from the first reactor 1 into the second reactor 2 is effected via the melt pump 6, a preheater 11 and a control valve 12.

As already mentioned, the production of polycondensates of partly aromatic copolyamides having average degrees of polycondensation is effected in the second continuous pressure stage in the form of the second reactor 2 by controlled removal of water in gaseous form from the melt and as a function of the aromatic content of the chemical system the control of system-dependent polycondensate/water equilibria in the melt according to predetermined melt viscosity/shear rate profiles at defined, system-dependent vapor pressures.

This further polycondensation of the partly aromatic system is carried out in the second pressure stage as a function of the aromatic content of the chemical system using internals 13 which introduce shear stress.

The melting point in the second reactor 2 is dependent on the chemical system.

The pressure in the second reactor 2 may be adjusted up to 99% below the pressure of the first continuous pressure stage in the first reactor 1.

In principle, the melting point in the reactor 2 which is to be specifically established via the preheater 11 is to be derived from the melting point of the partly aromatic polyamide/copolyamide and should be not more than 340° C. The temperature range for the melt is thus formulation-dependent and is in a range from $\geq 250°$ C. to $\leq 340°$ C.

At the reactor 2, it is possible to provide additional metering apparatuses which can be used both for introducing additives and for replenishing the small amounts of amine which are removed with the condensate.

For degassing the water-containing melt in the second reactor 2, required values in the range of 0-30 bar are specified for adjusting the vapor pressure in the reactor gas space. The vapor pressure is fixed by a pressure controller 15. The removal of the steam is effected via a degassing line 16 or a dephlegmator/reflux column 17.

The polycondensation process in the second reactor 2 is controlled by specifying a system-dependent maximum melt viscosity to be set and as a function of the aromatic content on the introduction of a constant shear stress. The measurement of the actual melt viscosity under the shear rate gradient resulting at constant shear stress is effected at a measuring device 18. Control of the melt flow in the case of melts having high partly aromatic fractions is possible by increasing the shear stress in the melt via the devices 13.

The regulation of the vapor pressures to be established in the second reactor 2 to values which are as constant as possible is effected by the removal of water in gaseous form from the melt via the dephlegmator 17, the degassing line 16 and the pressure controller 15.

If the flow behavior of the melt is inadequate or the melt viscosity for ensuring a continuous throughput is too high, a shear stress dependent on the structure-related viscoelastic flow behavior for the specific chemical system is introduced into the total melt volume or a part of the melt volume via the devices 13.

These devices 13 are driven by a motor 19 which is controllable and permits the introduction of a continuously variable shear or shearing force into the melt so that the viscosity thereof is reduced. The devices 13 themselves can be formed in a manner known to the person skilled in the art by wing- or knife-like constructions fixed to an output shaft of the motor 19.

The melt viscosity continuously measured by the measuring device 18 is used for controlling the motor 19 of the devices 13 introducing a shear force, in such a way that the structure-related flow behavior of the highly condensed, viscoelastic polymer melt is immediately influenced by an increased introduction of shear forces.

The residence time in the second reactor 2.1 is dependent on the chosen reaction temperature and the respective ratio of aromatic and aliphatic/cyclic polymer-forming components. It is from 0.5 to not more than 2.5 hours.

The discharge of the melt from the second reactor 2 is effected via a pump device 40 and a discharge line 41.

On achieving the quality parameters of the partly aromatic polyamide for processing, the melt from the second reactor 2 can be solidified, granulated and dried directly via a final device 42.

If a higher degree of polycondensation of the partly aromatic polyamide is desired, there are two alternatives after the second reactor 2:

$1^{st}$ alternative: granulation in the final device 42 and combination between drying and solid postcondensation of the granules.

$2^{nd}$ alternative: feeding of the melt from the second reactor 2 continuously to a third reactor 4 for postcondensation.

In the second alternative, a third, continuous postcondensation stage of the melt is connected for increasing the degree of polycondensation of the melt from the second pressure reactor 2.

The discharge of the melt from the reactor 2.1 is effected via the pump device 40 directly into the postcondensation reactor in the form of the reactor 4.

The reactor 4 contains kneader systems which are adapted to the flow behavior of the melt possessing structural viscosity. The melt is transported in such a way that pressure and flash zones are arranged alternately. The flash zones 43-45—in combination with the connection of the vacuum or of hot, conditioned nitrogen—ensure thorough removal of steam from the melt.

The temperatures of the melt are in the range of 280° C.-340° C. and are from 5 to 10° K. above the melting point of the respective copolyamide. The reactor throughputs are to be adjusted for minimum residence times.

The control of the degree of polycondensation by means of the thorough drying of the melt is carried out by the measurement of the resulting, system-dependent increase in the melt viscosity on discharge from the postcondenser.

The discharge of the melt is effected continuously from the last pressure zone of the third reactor 4 via a pump device 46 directly into the solidification/granulation/-processing 47.

Examples which do not limit the invention and which show the results which were evaluated for testing the technical feasibility of the method according to the invention are described below.

The examples described below for the continuous production of partly aromatic and semicrystalline copolyamides were effected exclusively in 10 liter batch systems having controllable stirring systems, the successive stages of the method in a continuous method from reactor to reactor having been simulated.

EXAMPLE 1

PA 6/6T with $m_p$=279° C.

30.5 mol % of hexamethylenediamine
0.50 mol % of aromatic diamine
31.0 mol % of terephthalic acid
38.0 mol % of ε-caprolactam Technology 10 Liter Autoclave:
 Adjustment of 30% strength by mass water/salt solutions, mixing of the starting components with stirring:
  Mixing time=1 h at a temperature of 100° C.
  $N_2$ pressure application=6 bar $1^{st}$ pressure stage=prepolymerization (with stirring):
 temperature=180 ° C.
 residence time=1 h
 vapor pressure=13 bar $2^{nd}$ pressure stage=polycondensation (with stirring):
 temperature=280° C.
 residence time=2 h
 vapor pressure=1.5 bar

EXAMPLE 2

PA 6/6T with $m_p$=306° C.

33.5 mol % of hexamethylenediamine
0.50 mol % of aromatic diamine
34.0 mol % of terephthalic acid
32.0 mol % of ε-caprolactam Technology 10 Liter Autoclave:
 Adjustment of 30% strength by mass water/salt solutions, mixing of the starting components with stirring:
  Mixing time=1 h at a temperature of 100° C.
  $N_2$ pressure application=6 bar $1^{st}$ pressure stage=prepolymerization (with stirring):
 temperature=200° C.
 residence time=1.5 h
 vapor pressure=13 bar $2^{nd}$ pressure stage=polycondensation (with stirring):
 temperature=300° C.
 residence time=2 h
 vapor pressure=3 bar

EXAMPLE 3

PA 6/6T with $m_p$=316° C.

37.0 mol % of hexamethylenediamine
1.0 mol % of aromatic diamine
38.0 mol % of terephthalic acid
24.0 mol % of ε-caprolactam Technology 10 Liter Autoclave:
 Adjustment of 30% strength by mass water/salt solutions, mixing of the starting components with stirring:
  Mixing time=1 h at a temperature of 100° C.
  $N_2$ pressure application=6 bar $1^{st}$ pressure stage=prepolymerization:
 temperature=220° C.
 residence time=1.5 h
 vapor pressure=20 bar $2^{nd}$ pressure stage=polycondensation:
 temperature=320° C.
 residence time=1.5 h
 vapor pressure=6 bar

The invention claimed is:

1. A method for continuously producing copolyamides having calorimetric melting points of more than about 265° C., in which, in a multistage and continuous method, partly aromatic and semicrystalline polyamides of the following chemical systems having defined mole percentages of the individual components are produced in the polymer synthesis:
 from 25 to 50 mol % of aromatic dicarboxylic acids which are derived from terephthalic acid,
 from 25 to 49.5 mol % of aliphatic diamines which are derived from hexamethylenediamine, or
 cycloaliphatic diamines having at least 6 carbon atoms, and 0.5-25 mol % of aromatic diamines,
  the sum of all polymer-forming components producing a composition of 100 mol % and there being a stoichiometric ratio between amines and carboxylic acids,
  wherein in a first reactor, a polycondensation is carried out by the controlled removal of water at approximately constant pressures of from 6 to 50 bar, temperatures of 180° C.-260° C. under adiabatic conditions and with residence times from 0.5 to 2.5 hours, and the process is continued to a chemical polycondensate/water equilibrium, and in that the polycondensation is controlled by establishing constant vapor pressures in the gas space of the reactor.
  the melt being passed from the exit of the first reactor into a second reactor, in which the polycondensation is carried out by the controlled removal of water at pressures of 0-30 bar (gage pressure), at temperatures of 250° C.-340° C. under adiabatic conditions, with residence times from 0.5 to 2.5 hours,
  the course of the polycondensation in the individual reaction stages being controlled via resulting viscoelastic melt flow behavior as a function of the aromatic content of the chemical systems,
  the polycondensation within the second reactor being carried out with simultaneous introduction of shear stress into the total melt volume, and the process is continued to a chemical polycondensate/water equilibrium.

2. The method as claimed in claim 1, wherein the composition furthermore contains:
 from 0 to 25 mol % of aliphatic dicarboxylic acids having at least 6 carbon atoms and/or
 0-20 mol % of an aromatic aminocaproic acid having at least 7 carbon atoms
 and/or
 from 0 to 38 mol % of a monomer from the chemical group consisting of the lactams or an
 aliphatic aminocaproic acid having at least 6 carbon atoms.

3. The method as claimed in claim 1 wherein at the start of the reaction in the first reactor, 2-30% by weight of water, based on 100% by weight of polymer-forming starting components, are used as solvent or suspending medium.

4. The method as claimed in claim 1, wherein 0-1.5% by weight of stabilizers from the group consisting of the mono-/ dicarboxylic acids and/or mono-/diamines, based on 100% by weight of polymer-forming starting components, are added to the system as polycondensation-influencing additives to the system.

5. The method as claimed in claim 1, wherein 0-1.5% by weight of crystallization-controlling additives, based on 100% by weight of polymer-forming starting components, are added to the system as polycondensation-influencing additives to the system.

6. The method as claimed in claim 1, further comprising the removal of water from the melt is intensified by surface-enlarging internals in the total reactor and the steam is removed via a dephlegmator.

7. The method as claimed in claim 2, wherein the aromatic and aliphatic starting components are fed to the first reactor as concentrated aqueous salt solutions having a maximum water content of 30%, and the lactams or aminocaproic acids as anhydrous melts via preheating and mixing systems, and are homogenized.

8. The method as claimed in claim 2, wherein a further homogenization of the melt is achieved by removal of part-streams at the lower outflow of the reactor and a circulation procedure via mixing systems into the top of the reactor.

9. The method as claimed in claim 8, further comprising direct metering for further polycondensation additives is present on the reactor, which additives are optionally also metered into the mixing system.

10. The method as claimed in claim 1, wherein the establishment of constant vapor pressures in the gas space of the reactor is derived and predetermined in a chemical system-related manner and the steam is removed and then condensed.

11. The method as claimed in claim 10, wherein the removal of the steam is effected via a reflux column.

12. The method as claimed in claim 9, wherein the second reactor has over shear stress-introducing internals which produce melt flow-dependent shear rate gradients in the melt volume, and in that the melt viscosity at the lower outflow of the reactor is measured by means of a melt viscometer and the measured value of the melt viscometer is used for controlling the shear stress-introducing internals in the reactor.

13. The method as claimed in claim 12, wherein the power torque of the shear stress-introducing internals is controlled by specifying chemical system-dependent setpoint values for the melt viscosity or for the flow properties of the melt.

14. The method as claimed in claim 9, wherein the melt is solidified, granulated, dried and/or subjected to solid postcondensation at the outflow of the second reactor.

15. The method as claimed in claim 9, wherein the melt is introduced into a further postcondensation stage at the outflow of the second reactor.

16. The method as claimed in claim 15, further comprising the postcondensation stage has kneader systems and possesses a zone structure which consists of a series of pressure and degassing zones, the exit zone of the reactor always corresponding to a pressure zone.

17. The method as claimed in claim 16, further comprising the melt is dried in the postcondensation stage at temperatures of from 280° C. to 350° C.

18. The method as claimed in claim 16, wherein the degassing zones have vacuum connections and the pressure zones have connections for conditioned nitrogen.

19. The method as claimed in claim 16, further comprising the melt viscosity is measured at the lower outflow of the second reactor by means of a melt viscometer and the measured value of the melt viscometer is used for controlling the kneader systems.

* * * * *